United States Patent [19]
Tweed

[11] Patent Number: 6,097,108
[45] Date of Patent: Aug. 1, 2000

[54] APPARATUS AND METHOD FOR FAIL-SAFE CONTROL OF EVENTS IN PREPARATION FOR ELECTRICAL POWER TRANSFERS

[75] Inventor: Steven Theodore Tweed, Madison, Wis.

[73] Assignee: Forward Electric, Inc., Madison, Wis.

[21] Appl. No.: 09/248,299

[22] Filed: Feb. 11, 1999

[51] Int. Cl.[7] .................................................. H02J 1/00
[52] U.S. Cl. ........................................ 307/31; 315/294
[58] Field of Search .............................. 180/179; 307/31, 307/85, 141; 315/294, 299; 323/270; 364/184; 379/399; 709/222

[56] References Cited

U.S. PATENT DOCUMENTS

| | | | |
|---|---|---|---|
| 4,731,547 | 3/1988 | Allenduff et al. | 307/85 |
| 5,085,287 | 2/1992 | Utsumi et al. | 180/179 |
| 5,422,808 | 6/1995 | Catanese, Jr. et al. | 364/184 |

*Primary Examiner*—Stephen W. Jackson
*Assistant Examiner*—Anore Henry
*Attorney, Agent, or Firm*—Patricia Smith King

[57] ABSTRACT

An apparatus and method for controlling events taking place at a facility participating in a power control program prior to a transfer of electrical power supply by the open transition transfer method. Neither notification nor time delays are currently available to facilities participating in power control programs of this sort. The apparatus is a controller that provides notification to the facility that the load-shedding event is about to occur by a system of alarms, and enables it to provide a time delay during which it may prepare for the transfer between its primary power source and its secondary power source. Such preparation may include the testing of its secondary power source located on site of the facility, usually a generator, and allows time during which it may be repaired if need be. It may also include the shut down of sensitive equipment and processes, such as computers and computerized equipment, which would be corrupted or otherwise damaged by the momentary loss of power inherent in the open transition method of transfer. The controller is connected serially to a utility company's remote signal relay box and the transfer switch controlling the transfer of power supply between the primary and secondary power sources. The controller comprises control logic circuitry consisting of a programmable logic controller and includes an uninterruptible power supply connected to the programmable logic controller to ensure its fail-safe operation should the main power fail. The programmable logic controller may be variably configured and programmed to fit the needs of the particular facility. It controllably produces command signals in response to various input conditions including those controlling time delays, warning alarms, the automatic shutdown of sensitive equipment and processes, and the activation and testing of the secondary power source.

15 Claims, 6 Drawing Sheets

To FIG. 5b

APPARATUS AND METHOD FOR FAIL-SAFE CONTROL OF EVENTS IN PREPARATION FOR ELECTRICAL POWER TRANSFERS

BACKGROUND OF THE INVENTION

1. Field of the Invention

This invention relates generally to control systems, and more specifically to an apparatus and method providing a fail-safe means to control events in preparation for the transfer of electrical power between primary and secondary sources. Applications of the apparatus include a control system for use during load-shedding events that alarms utility customers when a transfer of power is about to occur and provides time delays during which the customer and/or the controller can verify the operability of its secondary power source and safely shut down sensitive equipment and processes to avoid loss of data and other damage.

2. Description of Related Art including information disclosed under 37 CFR 1.97 and 1.98

Electrical utility companies have been faced with growing demands for power without coincident economical increases in their power supplies sufficient to meet the energy demand during peak load conditions. The formation and maintenance of generating capacities far in excess of average electrical power requirements in order to meet such occasional and short term peak demands, is quite expensive and raises the average cost of providing electrical power. As a result, many utility companies have initiated programs during times of peak energy load in which energy demands are decreased and/or some of the energy demand is filled by alternative energy sources. Customers are rewarded for participating in these programs by lowered utility rates and other incentives.

Some of these utility company power control programs involving commercial utility customers, require that participants provide alternative sources of power to handle all of their facility's energy demands during times of peak load. If utility company customers have agreed to participate in such a program, they are penalized by higher energy costs (peak demand charges and additional fines) if they are unable to transfer to their secondary power source when notified. Unfortunately, the way in which power transfers during load-shedding events currently occur, the customer has no warning that such an event is about to take place, nor do they have a way to test, and if need be repair, the operability of their secondary power source prior to the power transfer. If their secondary power source is not functioning when the utility company signals the transfer, the utility customer remains on the primary power source and pays the penalty.

In a typical current application of such a load-shedding program, an interface unit is installed at the participating customer's site by the utility company. This interface unit is a remote controlled relay box that receives a signal transmitted from the utility company by radio or other form of transmission. The signal indicates that a transfer between power sources is to occur. The signal is relayed to a transfer switch which operates to transfer power between the primary power source and the customer's secondary power source (usually a generator) at the beginning and end of such an event.

Usually the transfer switches made for use with generators provide open transition switching. Open, or break-before-make, transition between two power sources occurs when the transfer switch disconnects the source initially supplying power to the load before connecting the second source. This avoids the surges that would occur if two unsynchronized sources were connected to the load simultaneously. However, it also results in momentarily interrupting power to the load.

Unexpected and momentary losses of power have been tolerated in the past because they have resulted in relatively inconsequential occurrences such as the flickering of lights at customer facilities. However, such an interruption of power is unacceptable in certain applications. For instance, digital computers with volatile memories lose all the stored information if power is disconnected for longer than a very short interval. More and more of today's commercial facilities are highly computerized and contain equipment and processes which are sensitive to even these brief momentary losses of power. The transfer of power as it currently occurs, can cause data loss and damage to computers and other sensitive electronic equipment, some of which may be unrecoverable. With no notification or time in which to safely shut down these equipment and processes, a utility customer is unable to safely prepare for the power transfer and thereby avoid damage and loss.

Increasing numbers of commercial customers are participating in power control programs due to the economic incentives, and an increasing proportion of those customers are operating facilities incorporating computerized equipment and processes. There is a need to address the problem of damage to these sensitive equipment and processes resulting from the transfers of power during the power control events. There is also a need to be able to verify, and potentially repair, the operability of customer secondary power sources prior to the transfers. Otherwise, the economic benefit to the customer from participating in utility company power control programs will be outweighed by the risk of penalties for non-performance of its secondary power source, and worse yet, the risk of loss of data and other damage to its sensitive equipment and processes. These risks may outweigh the economic benefits and discourage customers from participating in the utility company power control programs. Thus, there is also a benefit to the utility companies in providing a means for the customer to safely participate in its programs. Utility companies have as yet not provided their customers with such means.

No devices have been found prior to filing this application which address the utility customer's problems as described above. In particular, no devices were found which would interface the utility company's relay box and the transfer switch of the customer's generator to provide the customer with, among other things, notification when transfers were about to occur and time delays during which the customer can take steps to protect its sensitive equipment and process and during which it may verify the operability of its generator (and repair it if need be). Transfer switches offer certain levels of control and programmability, but these are specific to parameters of the generator itself and do not provide a utility customer with a means of controlling other events at the customer's facility such as alarms, time delays and the safe shut down of equipment. The peak power shaving apparatus and method in U.S. Pat. No. 4,731,547 to Alenduff, et al., Mar. 15, 1998 provides a means of controllably operating a secondary electrical generator in parallel with, not instead of, the utility company's power source. It provides a means by which the customer can know when it is most economical for it to use more of its own secondary power to meet its electrical needs, but does not address the problems described above of customers whose electrical power supply is being completely transferred from one source to another.

As can be seen from the above, several problems exist with utility company power control programs and the equipment currently available for use by a utility customer. No notification is given the customer, nor is any time delay built into the current system which would allow the customer to prepare for the transfer. The customer is unable to test or prepare its generator for the transfer, and customers with sensitive equipment and processes risk data loss and/or other damages due to the transfer of power. No control systems currently exist to address this problem and provide the utility customer a means of notification and time delays during which the customer can make preparations for the transfer including verifying the operability of its secondary power source and safely shutting down sensitive equipment and processes.

The present invention is directed to overcoming one or more of the problems as set forth above.

BRIEF SUMMARY OF THE INVENTION

Accordingly, an apparatus and method for controlling events at electrical utility customer facilities during transfers of electrical power between that of a utility company and that of the utility customer is provided. Several objects and advantages of the present invention are to provide utility company customers participating in power control programs:

means by which they may be notified that a load-shedding event is about to occur;
  means by which they may specify time delays (within the constraints of utility company guidelines);
  means by which they may verify the operability of their secondary power source;
  means by which they may safely shut down sensitive equipment and processes manually or automatically, and by which they may control other devices;
  programmable logic means by which they may accomplish the above and other objectives in a customizable manner; and,
  power means by which they may accomplish the above objectives in a fail-safe manner.

Further objects and advantages of the present invention will become apparent from a consideration of the drawings and ensuing description.

BRIEF DESCRIPTION OF THE SEVERAL VIEWS OF THE DRAWINGS

For a better understanding of the present invention, reference may be made to the accompanying drawings, in which.

REFERENCE NUMERALS IN DRAWINGS

Figure 5A:
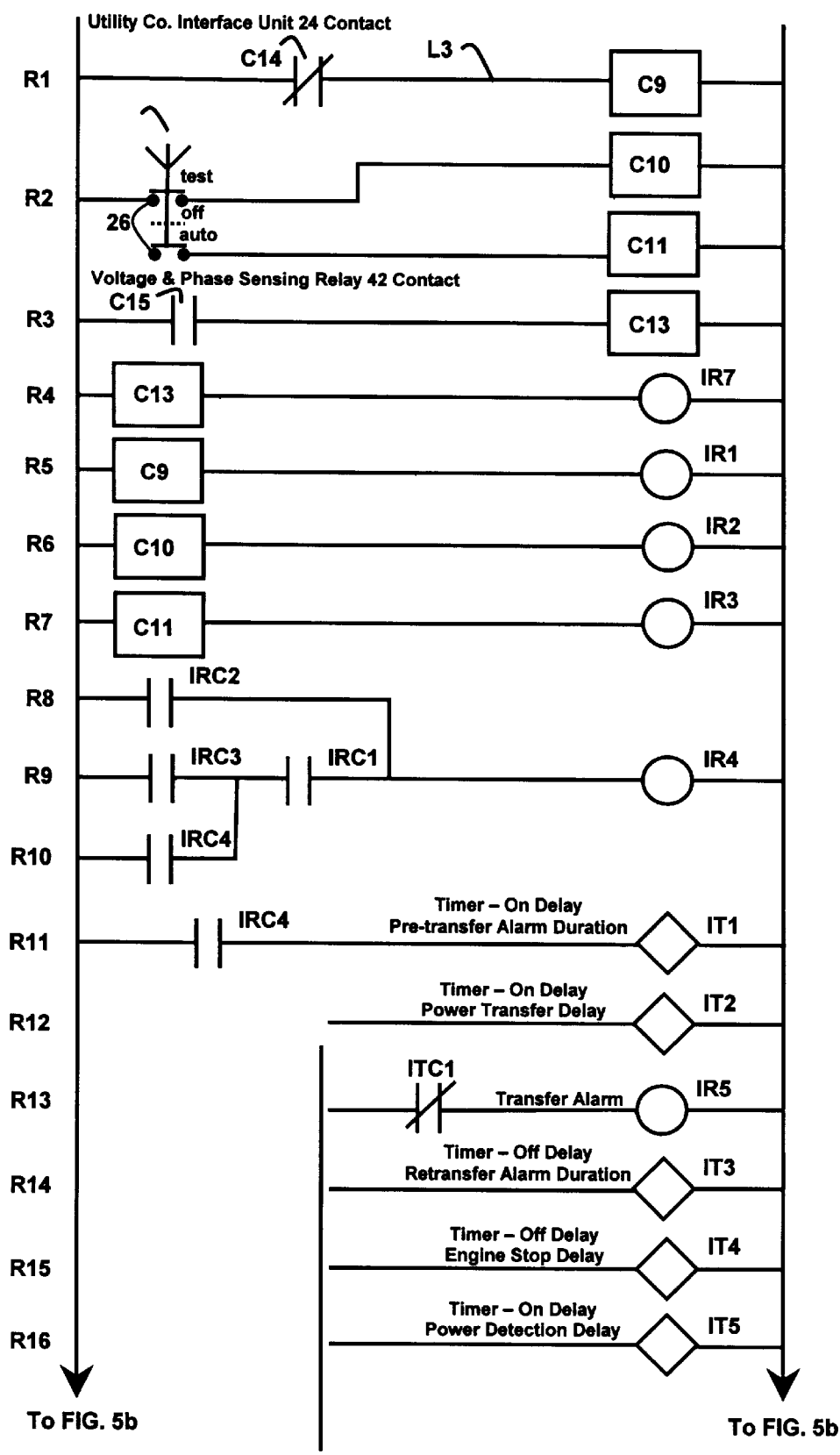
FIG. 5 (parts a and b) is a flowchart of software associated with an embodiment of the present invention that could be programmed into the programmable logic controller.
Figure 5B:
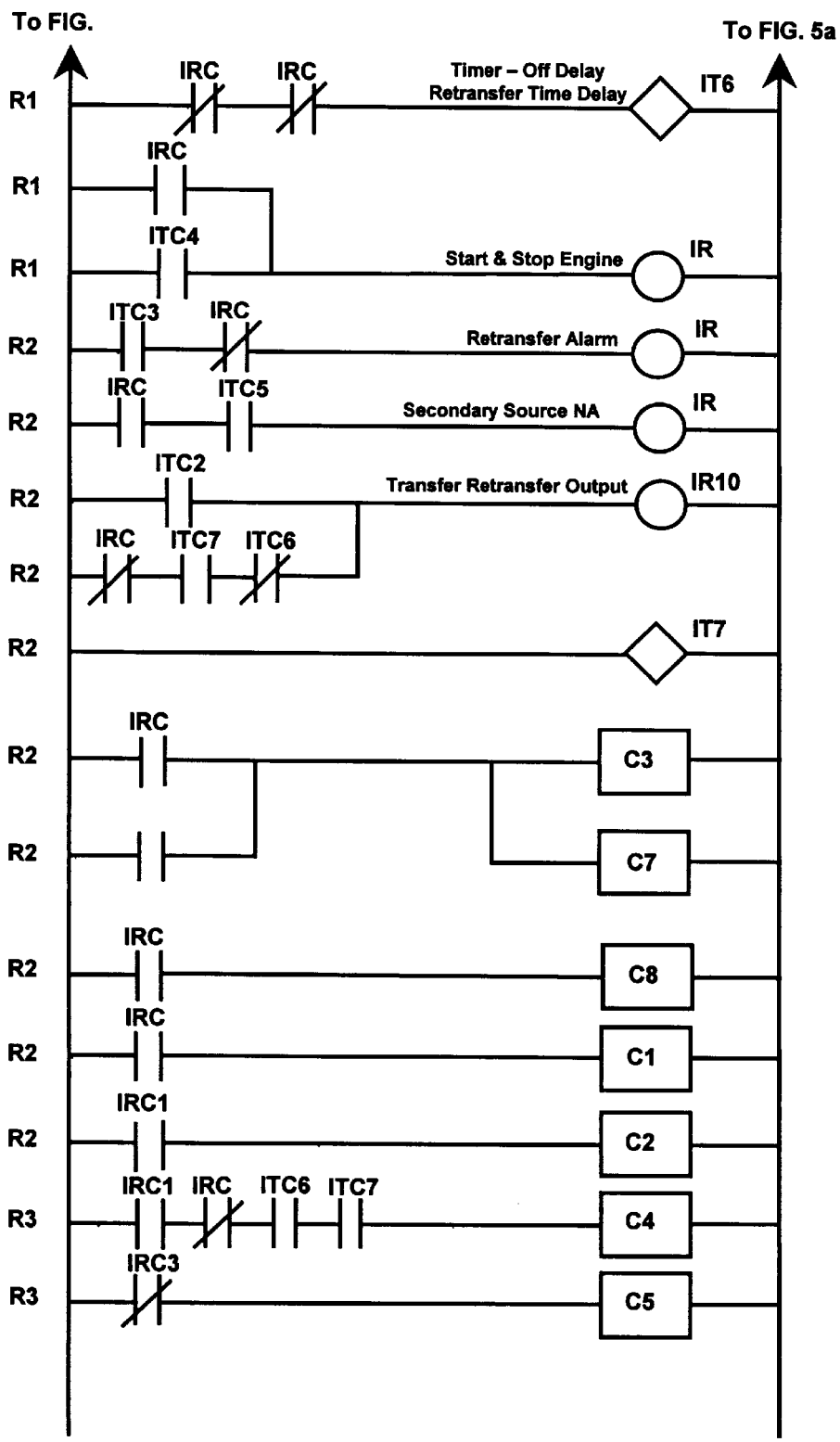

10 Controller.
12 Programmable logic controller (PLC).
14 Controller power input.
16 Uninterruptible power supply (UPS).
18 Power On light.
20 UPS On light.
22 Cooling fan.
24 Utility company interface unit.
26 Selector switch.
38 Alarms (audio/visual).
30 Alarm via phone system connection.
32 Secondary power source.
34 Customer equipment/processes.
36 Transfer switch.
38 Primary Power Source.
40 Secondary source not available alarm.
42 Voltage and phase sensing relay.
44 Not-in-Auto indicating light.
46 System ready indicating light.
L1 Circuit connecting controller power input 14 and the UPS 16.
L2 Circuit connecting the UPS 16 and the PLC 12.
L3 Circuit connecting the PLC 12 and the utility company interface unit 24 via PLC contact C9.
L4 Circuit connecting PLC 12 and alarms (audio/visual) 28.
L5 Circuit connecting PLC 12 and alarm via phone system connection 30.
L6 Circuit connecting PLC 12 and secondary power source 32.
L7 Circuit connecting PLC 12 and transfer switch 36.
L8 Circuit connecting PLC 12 and secondary source not available alarm 40.
L9 Circuit forming common input to alarm and indicator light output contacts C4–C8.
L10 Circuit connecting secondary power source 32 and voltage and phase sensing relay 42.
L14 Circuit connecting PLC 12 and the system ready indicating light 46.
L16 Circuit connecting PLC 12 and the Not-in-Auto indicating light 44.
C1 PLC 12 output contact to secondary power source 32.
C2 PLC 12 output contact to transfer switch 36.
C3 PLC 12 output contact to alarm via phone system connection 30.
C4 PLC 12 output contact to the system ready indicating light 46.
C5 PLC 12 output contact to the Not-in-Auto indicating light 44.
C6 PLC 12 output contact.
C7 PLC 12 output contact to alarms (audio/visual) 28.
C8 PLC 12 output contact to secondary source not available alarm 40.
C9 PLC 12 input contact from utility company interface unit 24.
C10 PLC 12 input contact from selector switch 26, Test position.
C11 PLC 12 input contact from selector switch 26, Auto position.
C12 PLC 12 input contact.
C13 PLC 12 input contact from voltage and phase sensing relay 42.
C14 Utility company interface unit 24 input contact.
C15 Voltage and phase sensing relay 42 contact.
IR1–IR10: Internal relay coils in the PLC 12, see FIG. 5a and 5b.
IRC1–IRC10: Internal relay coil contacts in the PLC 12, see FIG. 5a and 5b.
IT1–IT7: Internal timers in the PLC 12, see FIG. 5a and 5b.
ITC1–ITC7: Internal timer contacts in the PLC 12, see FIG. 5a and 5b.
R1–R31: Rungs in the logic diagram, see FIG. 5a and 5b.

DETAILED DESCRIPTION OF THE INVENTION

Figure 1:
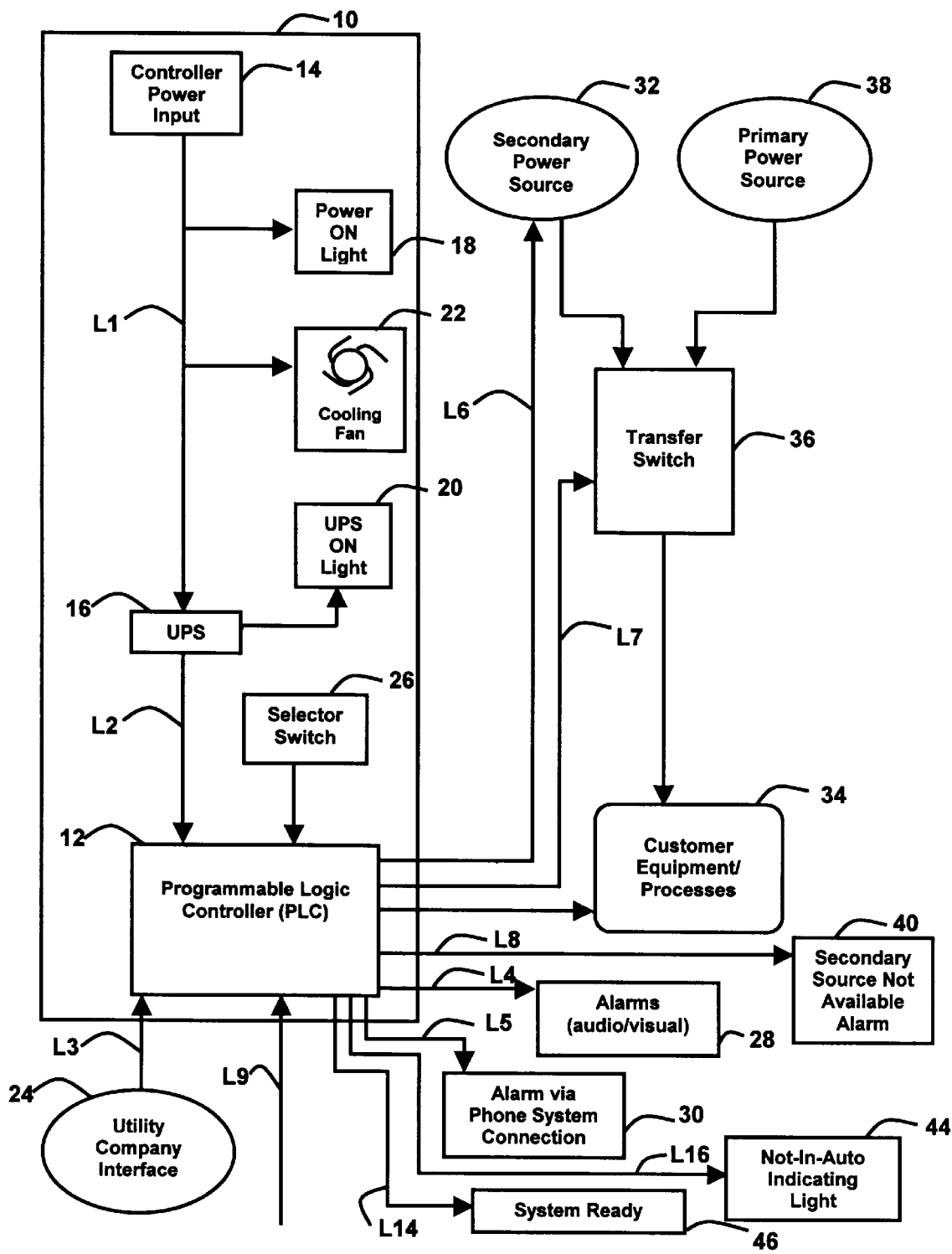
FIG. 1 is a schematized block diagram depicting the present invention and its typical components and how it is interfaced with utility company and customer components.

Referring now specifically to the figures, in which identical or similar parts are designated by the same reference numerals throughout, the first referring to FIG. 1, an apparatus embodying certain of the principles of the present invention, a controller, is generally indicated by the reference numeral 10. It should be understood that the following detailed description relates to the best presently known embodiment of the controller 10. However, the controller 10 can assume numerous other embodiments, as will become apparent to those skilled in the art, without departing from the appended claims.

The controller 10 includes programmable logic means in the form of a programmable logic controller 12 (PLC) powered by a controller power input 14 and backed-up by a power means in the form of an uninterruptible power supply 16 (UPS). A power On light 18 indicates when power is on to the controller 10 and a UPS On light 20 indicates when the UPS 16 output is on. A cooling fan 22 maintains the controller 10 at an optimum operating temperature. The cooling fan 22 and power On light 18 are connected in parallel with an input circuit L1 to the UPS, and are, therefore, not backed up by the UPS 16. The UPS 16 filtered power is brought to the PLC 12 via power input circuit L2.

The PLC 12 used in this example is a Cutler Hammer model number D50, but the PLC 12 could be another model or manufacturer depending upon the user's needs for input and output configuration. For example, the PLC 12 could be configured with additional outputs to control more devices than are currently noted in the detailed drawing of the PLC 12 in FIG. 4. An example of such an additional control function would be to allow the remote control shut down of sensitive equipment and processes 34. Likewise, the PLC 12 could be configured with additional inputs to monitor other conditions pertinent to the power transfer.

A relay box installed at the customer facility by the utility company is indicated by utility company interface unit 24. A signal to the utility company interface unit 24 marking the start and end of a load-shed situation, is received by the controller 10 via input circuit line L3 when a normally closed contact C14 within the utility company interface unit 24 opens (see FIG. 4). The controller 10 also contains a switch means in the form of a selector switch 26 that enables the utility customer to set the PLC 12 to Off or Auto modes, or to a Test mode that simulates a signal from the utility company and initiates the system sequence. When the controller 10 is either put into Test mode or the utility company sends a signal via the utility company interface unit 24, the PLC 12 responds by initiating various predetermined command signals including those causing one or more alarm contacts connected to power inputs to one or more alarms to close, thus activating them and thereby notifying the user of the impending transfer of power to a secondary power source (32). The alarms may be audio or visual such as a horn or a strobe light (28 connected via power output circuit L4 from PLC 12 contact C7, see FIG. 4), or connected to the user's phone system 30 (connected via power output circuit L5, from PLC 12 contact C3, see FIG. 4) to make an announcement over the intercom or a dialer to page someone if no one is at the site.

A time delay is one of the control functions programmed into the PLC 12 to enable the user to, among other things, shut down any sensitive equipment 34 that may be damaged during the power transfer and/or stop any processes 34 that may be affected by the power transfer. The PLC 12 is also programmed to start or verify that the secondary power source 32 is available via its connection L6 during this time. If the secondary power source 32 is not available at this point, the controller 10 will alarm the customer via a secondary source not available alarm 40 to allow the customer time to remedy the situation. This is an important function in that the utility company may charge a substantial penalty if it is unable to remove the customer from its service. Upon completion of the timed delay period the PLC 12 signals a transfer switch 36 via its circuit connection L7, to transfer the power supply to the secondary power source 32. The customer can then continue its operation as normal until the utility company notifies it (via a signal to the utility company interface unit 24) that the load-shed situation is about to end and that the user's electrical power supply will be transferred back to a primary power source 38. When this notification is received by the controller 10, an alarm (28 and/or 30) is sounded notifying the user that a transfer back to the primary power source 38 is about to occur and the sensitive equipment and processes 34 are shutdown again to avoid damage. When the controller 10's time delay is ended, it notifies the transfer switch 36 to transfer the power supply back to the primary power source 38.

Figure 4:
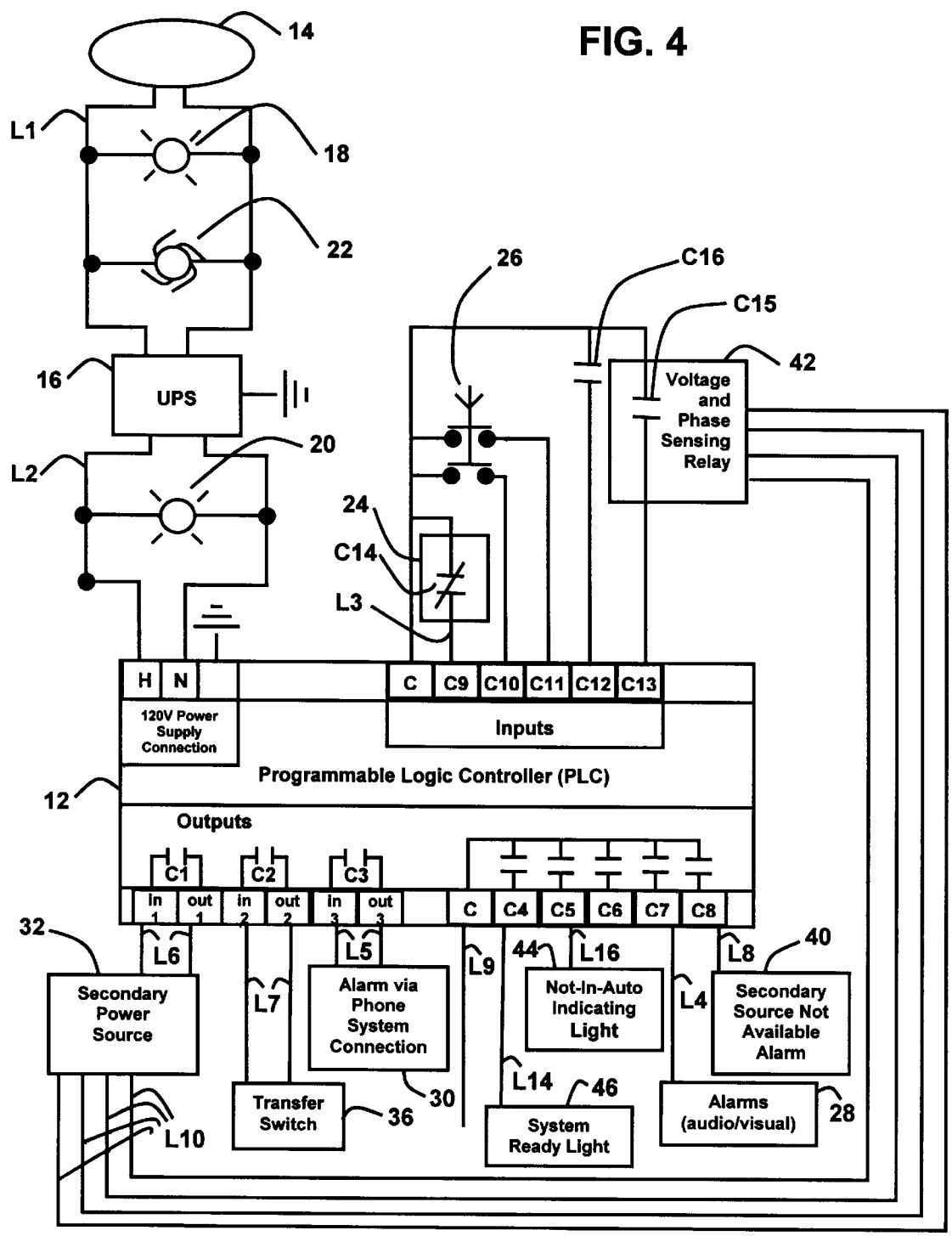
FIG. 4 is a detailed schematized block diagram of one embodiment of the present invention.

FIG. 4 depicts the physical connections of the components of the controller 10 and the devices it controls, providing greater detail than that shown in FIG. 1. The controller power input 14 can be various voltages, but is depicted here at 120 volts. The controller power input 14 is connected via circuit L1 to the UPS 16, the power On indicator light 18 and the cooling fan 22. The UPS 16 in this case is a 200 VA line interactive type with the case removed and the circuit board, transformer, and batteries mounted directly into the controller 10 cabinet. However, other types of UPS may be used as well depending upon the user's requirements. The UPS 16 provides uninterruptible power to the PLC 12, the common outputs of the PLC 12 (via circuit lines L4, L8, L14, and L16), and the UPS ON indicator light 20. The UPS 16 thus provides for fail-safe operation of the PLC 12 during times of power outage when controller power input 14 and/or common power input L9 to the alarm and indicator lights fail. The selector switch 26 provides the user with a method of testing the controller 10 (Test mode) and removing it from service (Off mode). With the selector switch 26 in the Auto position, the controller 10 is ready for operation as indicated by the lit system ready light 46.

The utility company interface unit 24's input contact C14 is normally a closed form "C" contact which is opened by a signal remotely transmitted from the utility company. When the utility company interface unit 24's input contact C14 opens, the circuit connected to an output contact C1 closes causing the secondary power source 32 to start and an internal timer in the PLC 12 to activate giving the user a timed delay to the transfer of power. This timed delay is user-definable during programming and is normally no longer than 15 minutes which is the time frame the utility companies usually use as a grace period between the time of notification and when the customer must be on their own secondary power source 32. If the secondary power source 32 is not available within a predetermined time period (usually 30 seconds) the controller 10 will close the PLC 12's output contact C8 and notify the user with the secondary source not available alarm 40 via circuit L8.

The controller 10 uses a voltage and phase sensing relay 42 to accomplish this. The voltage and phase sensing relay 42 is connected to the output of the secondary power source 32 via circuit L10 and verifies that all phases are being produced and that the voltage is within preset tolerances.

Contacts C3 and/or C7 also close to give the alarm (via the phone system connection 30 and/or audio/visual alarm 28) that the system will be transferring the power supply from the primary power source 38 to the secondary power source 32. The alarm (28 and/or 30) will continue for a user-determined time period. The controller 10 is then in it's time delay period allowing time for the user to shut down all equipment and processes 34 that would be disturbed by an open transition transfer of power. Upon completion of the time delay period, the controller 10 signals the transfer switch 36 via contact C2 and circuit L7, to transfer to the secondary power source 32. The customer can now continue their operation as they normally would until the utility company notifies them that the load-shed situation has ended and they can return to the primary power source 38. This notification is normally accomplished by the closing of the utility company interface unit 24's contact C14 which starts the time delay again and the alarms (28 and/or 30), giving the customer time to again shutdown their equipment and processes 34 in preparation for an open transition transfer of power. Once the time delay period ends, the controller 10 signals the transfer switch 36 via contact C2 and circuit L7 to return to the primary power source 38. This completes the programmed sequence and returns the controller 10 to the ready mode (Auto setting).

Figure 2:
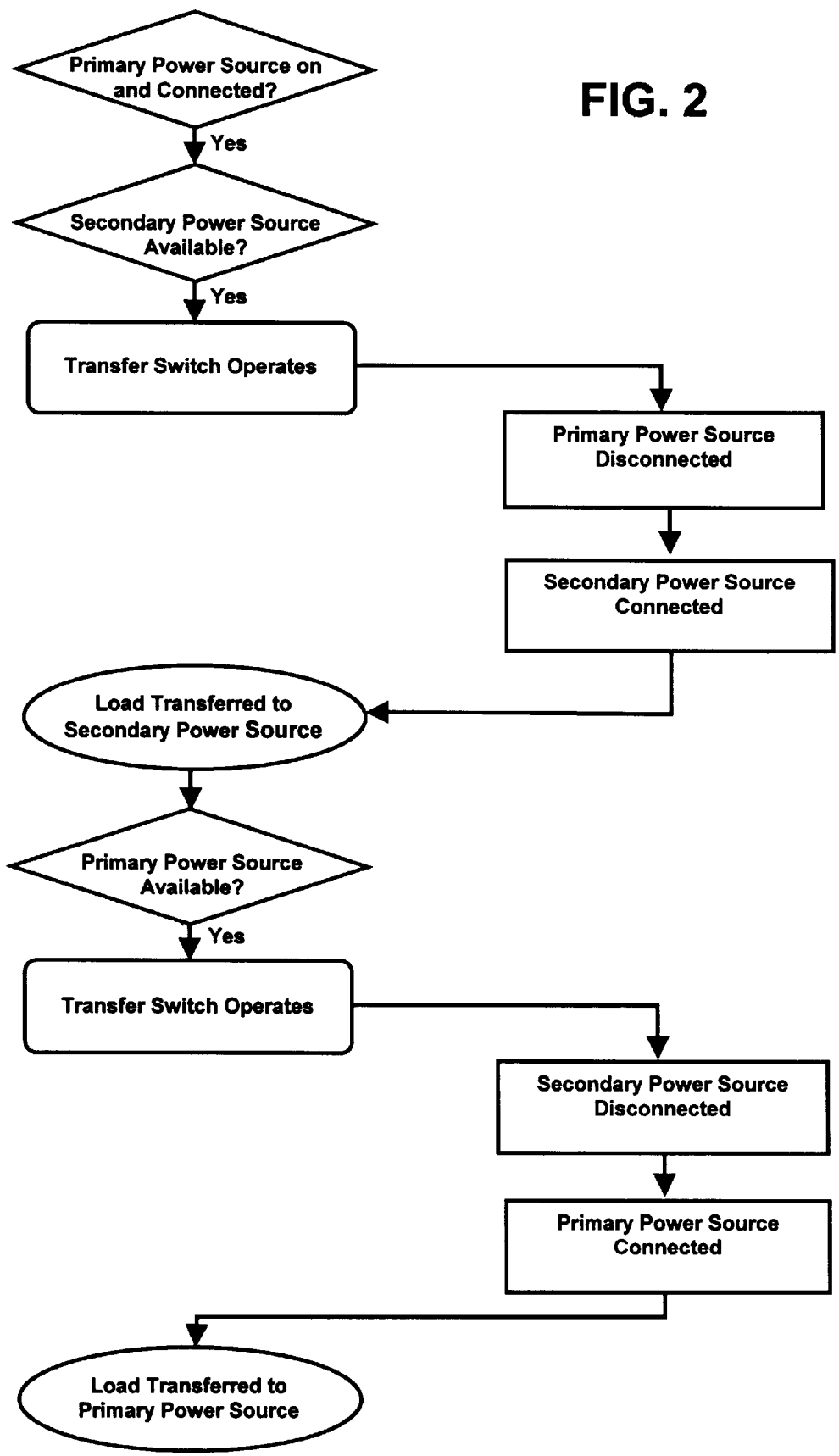
FIG. 2 is a functional flowchart depicting the open transition transfer method of power supply transfer without incorporation of the present invention.

FIG. 2 depicts a typical transfer switch 36 flow diagram using the open transition method of power transfer and not including the present invention. As shown in FIG. 2, the entire typical system is without power during the time between when the primary power source 38 is disconnected and the secondary power source 32 is connected. It is again without power when the reverse occurs, that is, when the secondary power source 32 is disconnected and the primary power source 38 is reconnected. These momentary periods during which the customer's facility is without power, can cause data loss in computer systems as well as damage to other sensitive equipment and processes 34 and is the primary reason for development of the present invention. Also, the inclusion of a UPS 16 in the present invention as shown in FIG. 1, prevents the loss of power to the PLC 12 during these two events. This minimizes the chance for logic corruption in the PLC 12 and the resetting of the system that would otherwise occur.

Figure 3:
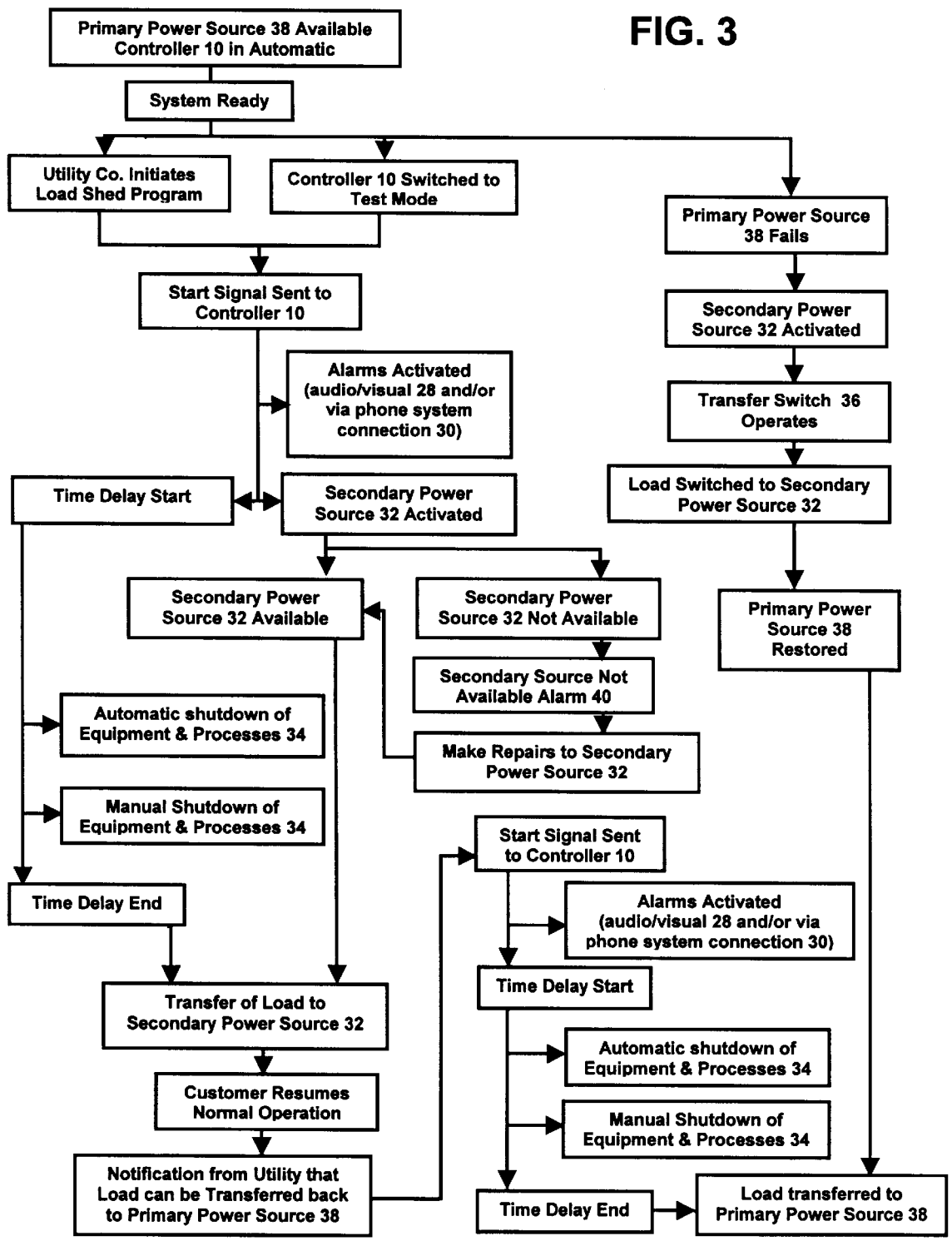
FIG. 3 is a functional flowchart depicting the steps in the power supply transfer when the present invention is incorporated.

FIG. 3 is a flow diagram depicting the typical operation of a system at the site of a customer participating in a utility company's power load-shed program like that depicted in FIG. 2, but incorporating the present invention.

The flow diagram begins at the top with a depiction of the system in the ready mode with the primary power source 38 connected and the controller 10 at the ready in automatic (Auto) mode (depicted by the diagram's "system ready" box). There are three events that can initiate a power transfer from this state: (1) a power outage, (2) a signal from the utility company that a load-shed situation is starting, or, (3) the controller 10 is put into test mode. If the primary power source 38 fails, the secondary power source 32 is started and the power is transferred normally with no input from the controller 10.

However, if either the utility company signals that a load-shed situation is starting or the controller 10 is put in Test mode, the controller 10 will start its program and begin with the alarms (audio/visual 28 and/or phone system connections 30), the time delay, and the activation of the secondary power source 32. The time delay allows the user a predetermined amount of time to shut down any sensitive equipment and processes 34. The PLC 12 can be programmed to initiate these shutdowns automatically if the equipment or processes 34 are equipped with accessories to enable this option. The equipment and processes 34 need to be shut down and ready for the transfer of power before the time delay ends. The controller 10 starts the secondary power source 32 and verifies that it is available. If the secondary power source 32 is not available, the controller 10 will alarm the user (via a secondary source not available alarm 40) to give the user time to troubleshoot the problem and get the secondary power source 32 ready. When the time delay ends, the controller 10 activates the transfer switch 36 which in turn transfers the power supply to the secondary power source 32. (Note that if the secondary power source 32 is still not available at this point, the transfer switch 36 will not operate due to it's own internal safety system and the user will remain connected to the primary power source 38). The user can then continue normal operations until notified by the utility company that the load-shed situation is over and they can switch back to their primary power source 38.

When the load-shed period is over, the utility company will notify the customer in the same fashion as at the start of the load-shed event. The controller 10 will then give an alarm (28 and/or 30), letting the user know that the utility company intends to transfer their power supply back to the primary power source 38 and that the time delay has begun to allow them time to shutdown the equipment and processes 34. When the time delay ends the controller 10 signals the transfer switch 36 that it may transfer back to the primary power source 38 and the transfer switch 36 shuts down the secondary power source 32 (if applicable). The resetting of the controller 10 is automatic upon completion of all items.

FIG. 5 is a ladder diagram of the logic circuit that is programmed in the PLC 12 inside the controller 10. It is included to exemplify one out of the many ways in which a utility customer can customize the PLC 12's programming to meet its control needs.

Starting with rung R1 of the ladder diagram, the first item is the external utility company interface unit 24's input contact C14 (hereinafter called "utility contact C14") which is connected to the PLC 12's input contact C9. Rung R2 is the 3-position selector switch 26 that will either put the system into test mode (via PLC 12 input contact C10), turn the system off, or put the system into automatic mode (via PLC 12 input contact C11). Automatic is the normal state that this switch will be in. Rung R3 is an input signal from the external voltage and phase sensing relay 42 via its contact C15. The signal reaches the PLC 12 via its input contact C13.

Rungs R4, R5, R6, and R7 indicate the input signals from PLC 12 input contacts C9, C10, C11, and C13 that will actuate internal relays in the PLC 12 program (IR1, IR2, IR3, and IR7). The program can either start by the selector switch 26 being set to test mode, or by the selector switch 26 being set to the Auto position and the utility contact C14 opening. The opening of utility contact C14 de-energizes relay IR1 and closes contact IRC1 on rung R9. The energizing of relay IR2 causes the contacts associated with it to change state (IRC2 on rung R8 and rung R17). These changes then cause relay IR4 to energize and change the state of all contacts associated with it (IRC4 on rungs R10, R11, R17, R18, R20, R23, and R30). These changes then energize the following: timers IT1 on rung R11, IT2 on rung R12, IT3 on rung R14, IT4 on rung R15, IT5 on rung R16, and relay IR6 on rung R19 which starts the engine of a generator in this example.

Timer IT1 controls the pre-transfer alarm duration. This is an on delay timer. When energized, its contacts remain unchanged until its time period has expired, after which they will change state. On rung R13 there is a normally closed contact ITC1 of timer IT1 that allows power to flow to relay IR5 until the time period expires. Relay IR5 has a contact IRC5 on rung R25 which closes PLC 12 output contacts C3 and C7 giving an alarm indication to the customer via alarms 28 and 30.

Timer IT5 controls the delay in detection of the secondary power source 32. This is an on delay timer. When energized its contacts remain unchanged until its time period has expired, at which time they will change state. On rung R21 there is a contact ITC5 from timer IT5 that will change state upon the completion of the time period. If at that time the voltage and phase sensing relay 42 has not detected the presence of the secondary power source 32 and did not change the state of contact IRC7 on rung R21, the alarm 40 will be given that the secondary power source 32 is not available.

Timer IT2 controls the delay in transferring the power to the secondary power source 32. This is an on delay timer. When energized, its contacts remain unchanged until its time period has expired, after which they will change state. On rung R22 there is a normally open contact ITC2 controlled from timer IT2. This contact ITC2 will remain open until the time period has expired and then change state energizing relay IR10. Relay IR10 closes its output contact IRC10 on run R29, which in turn closes PLC 12's output contact C2 and allows the power supply to be transferred to the secondary power source 32.

Timer IT3 controls the retransfer alarm duration. This is an off delay timer. When energized its contacts change state, when de-energized, its contacts will remain in their energized state until the time period expires, and then return to their de-energized state. Timer IT3 has a contact ITC3 on rung R20. Upon the de-energizing of relay IR4 (which signals the return to the primary power source 38), power is allowed to flow to relay IR8 closing its contact IRC8 on rung R26, which in turn, closes PLC 12 output contacts C3 and C7, giving the alarm that the return to the primary power source 38 is going to happen. Timer IT3's delay time controls this alarm duration.

Timer IT4 controls the engine stop delay. This is an off delay timer. When energized, its contacts change state, when de-energized its contacts remain in their energized state until the time period expires, and then return to their de-energized state. Timer IT4 has a contact ITC4 on rung R19. This contact keeps the engine of the secondary power source 32 running for a predetermined time period after the power supply has been transferred back to the primary power source 38, normally this is done to give the engine time to cool down before allowing it to shutdown.

Timer IT6 controls the retransfer time delay. This is an off delay timer. When energized its contacts change state, when de-energized its contacts will remain in their energized state until the time period expires, and then return to their de-energized state. Timer IT6 has a contact ITC6 on rung R23 that will remain closed until the time period has expired allowing the secondary power source 32 to remain connected after the signal to return to the primary power source 38 is given. This signal could be given either by the utility company via utility contact C14 or the test switch 26 being moved from the test position to the Off or Auto positions.

Thus the reader will see that the controller 10 of the present invention provides a fail-safe, simple and customizable means by which a utility customer can control events which occur when power supplies are transferred during power control programs. Utility customer facilities operating sensitive equipment and processes such as computer systems, can avoid the loss of data and other damage by utilization of the present invention. Notification and time delays are provided to allow the customer notice and time to safely shut down its equipment before a power transfer occurs. The controller 10 incorporates a UPS 16 to provide for fail-safe operation during power outages and avoid corruption of the PLC 12's logic circuitry.

While the above description contains many specificities, these should not be construed as limitations on the scope of the invention, but rather as an exemplification of one preferred embodiment thereof. The above-described embodiment is set forth by way of example and is not for the purpose of limiting the present invention. It will be readily apparent to those skilled in the art that obvious modifications, derivations and variations can be made to the embodiment without departing from the scope of the invention. For example, The controller 10 can be used with variable voltage power sources, not just the 120 V source as used in the above description.

The PLC 12 and UPS 16 components of the controller 10 can be of various makes and models.

The logic circuit of PLC 12 can be programmed to set the time delays to different amounts, alarms to different types (audio or visual, remote alarms via phone systems, etc.), and controls can be added to perform different functions (such as the remote shut-down of sensitive equipment and processes).

Additional and/or different input devices can be connected to the PLC 12 (note the currently unused input to PLC 12 contact C12 via a device contact C16 in FIG. 4).

Additional and/or different output devices can be connected to the PLC 12 (for example other types of alarms, indicator devices, equipment).

Accordingly, the scope of the invention should be determined not by the embodiment illustrated, but by the appended claims and their legal equivalents.

I claim:

1. An apparatus for fail-safe control of a plurality of events at a facility prior to the occurrence of an electrical power transfer at said facility, said plurality of events occurring after a signal is transmitted to a relay box at said facility and before said relay box subsequently triggers a power transfer switch to initiate said electrical power transfer between a primary power source and a secondary power source by an open transition transfer method, said apparatus being connected in series between said relay box and said power transfer switch, comprising:

a. programmable logic means electrically connected to said relay box by an input circuit and to said power transfer switch and a plurality of devices by a plurality of output circuits, which will:

(1) receive said signal and control the transmission of said signal to said power transfer switch, (2) control said plurality of events occurring prior to said electrical power transfer, (3) controllably store a plurality of control parameters including a plurality of time delay values and a plurality of predetermined control functions, (4) produce predetermined command signals, and (5) transmit said predetermined command signals to said transfer switch and said plurality of devices, b. power means electrically connected to said programmable logic means to provide fail-safe operation of said programmable logic means in the event of a main power failure, and c. switch means connected to said programmable logic means to controllably operate said apparatus, whereby said plurality of events will be programmably controlled in a fail-safe manner.

2. The apparatus, as set forth in claim 1, wherein said programmable logic means comprises a programmable logic controller.

3. The apparatus, as set forth in claim 1, wherein said power means comprises an uninterruptible power supply.

4. The apparatus, as set forth in claim 1, wherein said switch means comprises a manual switch for manually setting said apparatus in an operational mode.

5. The apparatus, as set forth in claim 1, wherein said secondary power source comprises an electrical generator.

6. The apparatus, as set forth in claim 1, wherein said plurality of devices comprise:

a. said secondary power source, b. a plurality of equipment, c. a plurality of alarms, and d. a plurality of indicator lights.

7. The apparatus, as set forth in claim 1, wherein said plurality of events includes a notification of said electrical power transfer.

8. The apparatus, as set forth in claim 1, wherein said plurality of events includes a shutdown of said plurality of equipment.

9. The apparatus, as set forth in claim 1, wherein said plurality of events includes a testing of said secondary power source.

10. The apparatus, as set forth in claim 1, further comprising indicator means electrically connected to said apparatus and said power means for providing an indication of their status.

11. The apparatus, as set forth in claim 1, further comprising cooling means electrically connected to said apparatus to maintain an optimum temperature for its operation.

12. A method of fail-safe control of a plurality of events at a facility prior to the occurrence of an electrical power transfer at said facility, said plurality of events occurring after a signal is transmitted to a relay box at said facility and before said relay box subsequently triggers a power transfer switch to initiate said electrical power transfer between a primary power source and a secondary power source by an open transition transfer method, comprising the steps of:

a. providing a programmable logic means electrically connected to said relay box by an input circuit and to said power transfer switch and a plurality of devices by a plurality of output circuits, which will:

(1) receive said signal and control the transmission of said signal to said power transfer switch, (2) control said plurality of events occurring prior to said electrical power transfer, (3) controllably store a plurality of control parameters including a plurality of time delay values and a plurality of predetermined control functions, (4) produce predetermined command signals, and (5) transmit said predetermined command signals to said transfer switch and said plurality of devices, b. providing a power means electrically connected to said programmable logic means to provide fail-safe operation of said programmable logic means in the event of a main power failure, and c. providing a switch means connected to said programmable logic means to controllably operate said apparatus, whereby said plurality of events will be programmably controlled in a fail-safe manner.

13. The method, as set forth in claim 12, wherein said providing programmable logic means step comprises electrically connecting a programmable logic controller to said relay box by an input circuit and to said power transfer switch and a plurality of devices by a plurality of output circuits.

14. The method, as set forth in claim 13, wherein said providing a power means step comprises electrically connecting an uninterruptible power supply to said programmable logic controller.

15. The method, as set forth in claim 13, wherein said providing a switch means step comprises electrically connecting a switch to said programmable logic controller, said switch controlling the state of a plurality of input contacts in said programmable logic controller.

* * * * *